April 13, 1926.

S. H. WISMER

MOTOR GOVERNOR

Filed August 16, 1924

INVENTOR
Samuel H. Wismer.

WITNESS

BY
ATTORNEYS

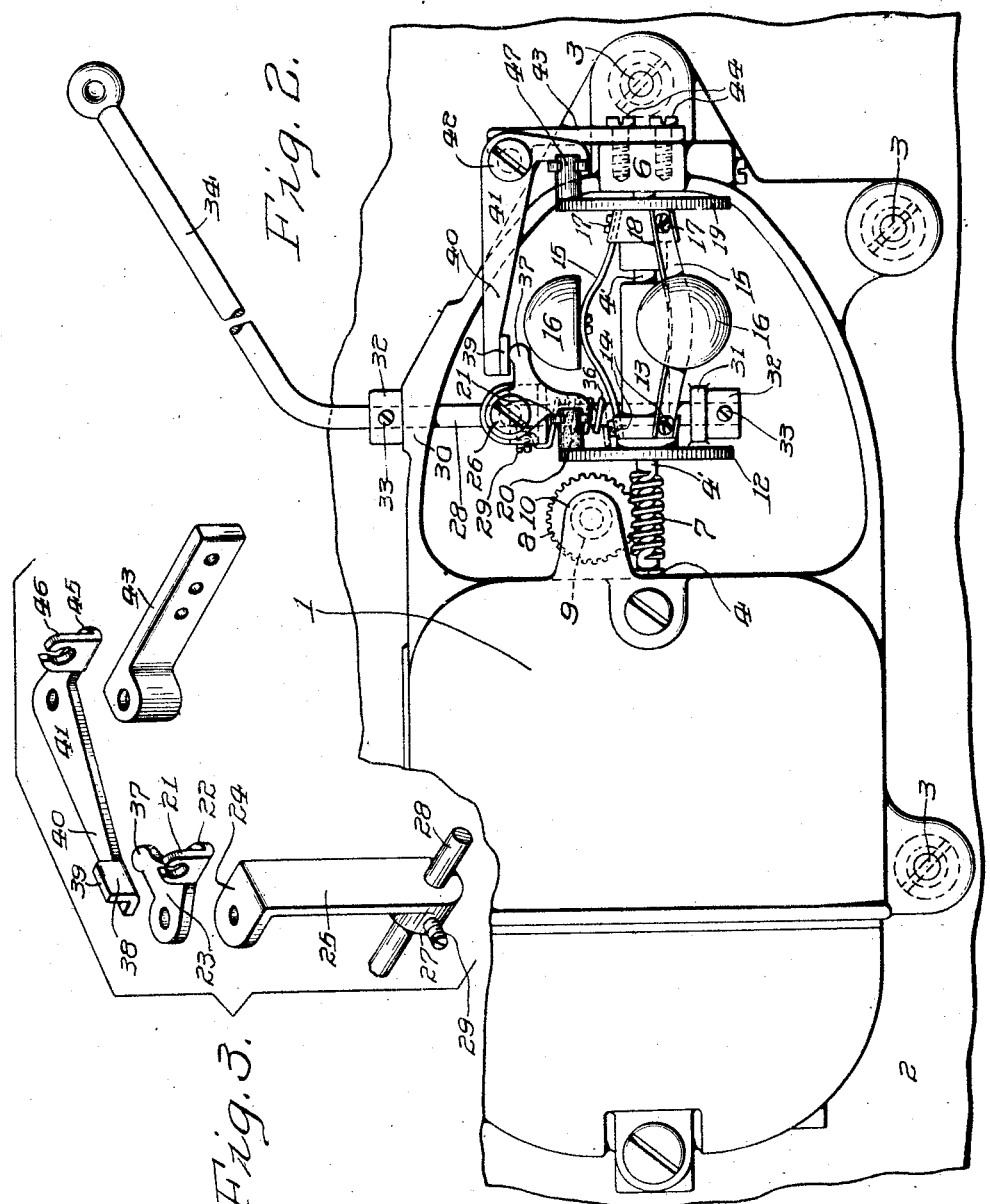

Patented Apr. 13, 1926.

1,580,549

UNITED STATES PATENT OFFICE.

SAMUEL H. WISMER, OF PALMYRA, NEW JERSEY, ASSIGNOR TO VICTOR TALKING MACHINE COMPANY, A CORPORATION OF NEW JERSEY.

MOTOR GOVERNOR.

Application filed August 16, 1924. Serial No. 732,584.

*To all whom it may concern:*

Be it known that I, SAMUEL H. WISMER, a citizen of the United States, and a resident of Palmyra, in the county of Burlington, State of New Jersey, have invented certain new and useful Improvements in Motor Governors, of which the following is a specification.

My invention relates to motors, and more particularly to the governors for motors which are required to run at a substantially invariable speed. Motors for talking machines are peculiarly required to run at such speeds because any substantial change in the rate of speed of the turntable produces very considerable variations in the pitch of the selection on a record being reproduced. In motors for sound reproducing machines, it is essential that the governor mechanism be very sensitive to the slightest variations in the speed of the motor. Sensitiveness in governors may be increased by increasing the speed of the governor, but any substantial increase in the speed of a governor for sound reproducing machines, over that now generally employed, increases the governor noises and would make it necessary to exercise much more care and employ finer workmanship to secure a more perfect balance of the parts of the governor.

One object of my invention is to render governor mechanisms more sensitive and responsive to speed variations without increasing the speed of the governor over that now generally employed, by relieving the governor of a substantial part of the work of braking the motor and leaving the amount of work to be performed by the governor only that necessary for speed controlling purposes.

A further object of my invention is to provide a governor mechanism with a supplemental braking or speed reducing mechanism controlled by the governor mechanism, whereby the torque load on the governor springs is reduced and much of the work of braking the motor is transferred to said braking mechanism.

A further object of my invention is to provide a structure wherein the braking action of the supplemental braking mechanism is applied to a high speed part of the motor where the braking action thereof is most effective. In talking machine motors, and motors of that type, the governor shaft rotates at a speed higher than any other part of the motor. In spring motors, therefore, the governor shaft is a shaft separate and distinct from the main power or driving shaft. In talking machine motors in which power is supplied from an electric motor, the power shaft is generally the high-speed shaft of the talking machine motor as a whole, and, therefore, in such motors the governor shaft and the power shaft are one and the same,—that is to say, the governor mechanism is mounted directly on the power shaft. From the above it is to be understood that in certain instances the governor shaft may also be the main or power shaft of the talking machine motor.

A further object of my invention is, therefore, to provide a governor mechanism with a supplemental braking mechanism to relieve the governor disc of performing unnecessary work, such braking mechanism to be also mounted to cooperate with the governor shaft where its action will be most effective and efficient.

A further object of my invention is to provide a simple, easily adjusted mechanism which will apply a braking or speed-retarding friction at two points on the governor shaft, namely, on the governor disc, which is generally yieldingly supported on the governor shaft, and on a friction surface or disc also mounted on the governor shaft but rigidly connected thereto and rotated thereby.

A further object of my invention is to provide a mechanism whereby a small variation in the movement of the governor disc produces a powerful braking action in the supplemental braking mechanism whereby the greater part of the speed retarding or braking action is performed by the braking mechanism.

Other objects of my invention will appear in the specification and claims below.

In the accompanying drawings forming a part of this specification my invention is shown as applied to a talking machine motor in which power is derived from a high speed electric motor and the power shaft is also the governor shaft.

Fig. 2 is a bottom plan view of the construction shown in Fig. 1.

Figure 1:
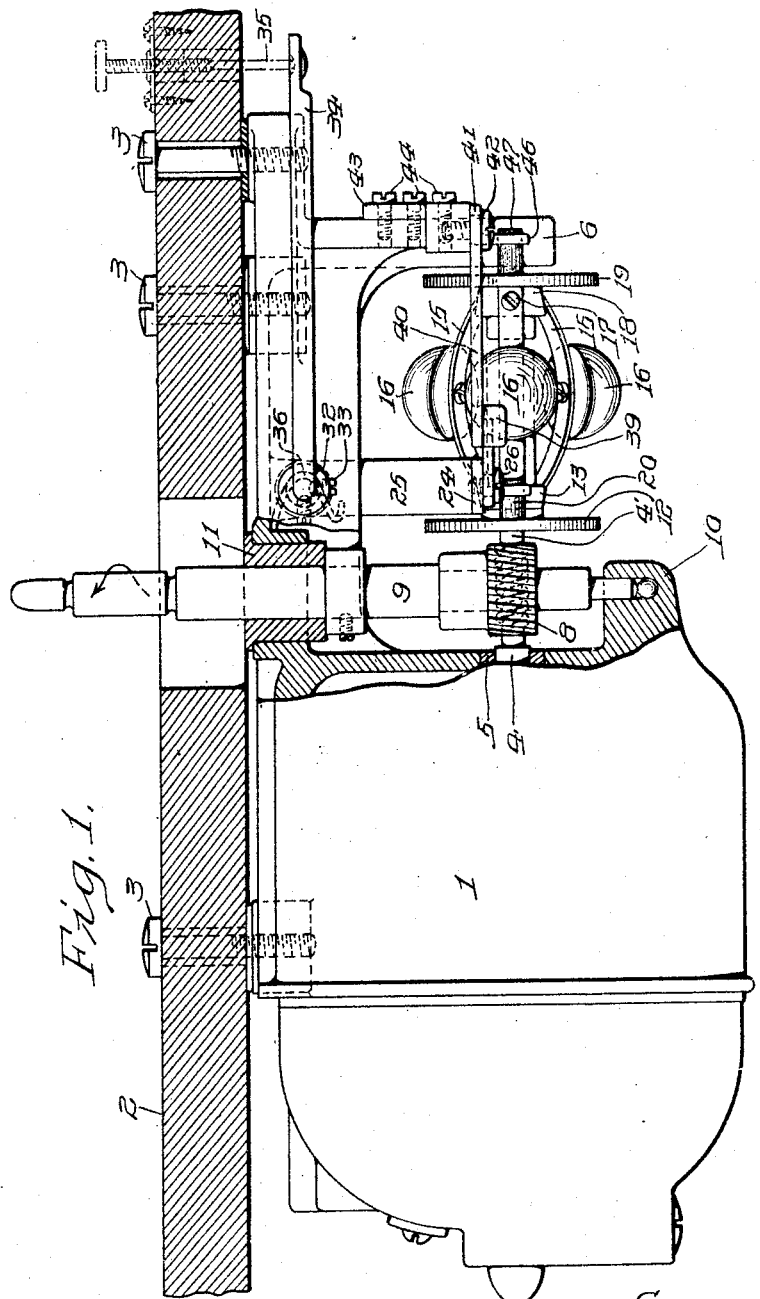
Fig. 1 is a side elevational view of my improved governor mechanism, parts of the motor, the motor-board and turntable spindle bearings being shown in vertical cross-section.

In Fig. 3 is illustrated in perspective the parts of the governor mechanism separated but substantially in their relative positions with respect to each other.

In Figs. 1 and 2 is illustrated an electric motor 1 secured to the underside of a motor-board or partition 2 by screws 3 and the projecting end of the motor shaft 4 is mounted in bearings 5 and 6 and forms the governor shaft of the mechanism.

The motor shaft 4 is preferably provided with a worm 7 which meshes and drives a worm wheel 8 on the vertical turntable spindle 9 which in turn is journaled in bearings 10, 11 carried by the frame of the motor 1.

On the projecting end 4' of the shaft 4 is mounted the governor disc 12 to the hub or sleeve 13 of which is attached, by screws 14, one end of each of the springs 15, each spring carrying a flyball 16. The other ends of the springs 15 are rigidly secured by screws 17 to the hub 18 of a friction or supplemental braking disc 19 rigidly secured to and rotating with the shaft 4 and its extension 4'.

The governor disc 12 with its unitary sleeve or hub 13 is not rigidly secured to the shaft 4'. It is free to slide longitudinally of the shaft 4' under the pull or centrifugal force developed in the flyballs 16 which are driven from the shaft 4—4' through the yielding springs 15 attached to the hub 18 of the shaft 4'. The governor disc 12 is, however, subject to a slight rotational movement with respect to the governor shaft 4' by reason of its resilient connection with the hub 18 through the springs 15.

Cooperating with this floating governor friction disc 12 is a friction applying member or pad 20 permanently secured in an offset clamp or holder 21 at the end of the arm 22 of a bell crank lever 23. This bell crank lever 23 is pivotally mounted on the offset end 24 of a lever 25 by a pivot pin or screw 26. The other end of the lever 25 is provided with a hub 27 mounted on a rock shaft 28 and rigidly secured thereto by a set screw 29.

The rock shaft 28 is mounted in bearings 30 and 31 in the motor frame 1 and horizontal movement of said rock shaft 28 with respect to said bearings may be prevented in any suitable manner as by sleeves or collars 32 bearing respectively against the outer faces of said bearings 30 and 31 and secured to said rock shaft by set screws 33.

One end of said rock shaft 28 may be bent to form a lever or arm 34 and the end of said arm 34 is adapted to be pressed upwardly against the lower end of a speed adjusting screw 35 by a spring 36 coiled around said rock shaft 28 and having one end bent around or hooked to the lever 25 and the other end engaging or pressing against the underside of the motor casing 1.

The other arm 37 of the bell crank lever 23 is preferably rounded and the rounded surface thereof is normally held pressed against a flat surface 38 provided by the lip 39 at the end of the longer arm 40 of the bell crank lever 41 pivoted on a pivot pin or screw 42 to a bracket 43, said bracket being rigidly secured to the governor shaft bearing 6 by screws 44. Said bracket 43 extends laterally from said bearing 6.

The end of the shorter arm 45 of the bell crank lever 41 is also bent laterally to form a clamp or holder 46 for a friction applying member or pad 47 arranged to press against the brake disc 19 when the long arm 40 of said lever 41 is moved outwardly away from the axis of the governor shaft 4'.

This disc 19 and its cooperating pad 47 substantially form a brake on the governor shaft, the braking action of which is controlled, varied and regulated by the pressure between the governor disc 12 and its coacting pad 20.

The operation of my device will now be readily understood. When the motor is stationary the governor disc 12 will be positioned a little to the left of the position shown in Fig. 1 and out of contact with the friction pad 20. In starting the motor, as the speed increases the flyballs 16 move radially outwardly from the axis of the governor shaft flexing the springs 15 and drawing the governor disc 12 longitudinally of the shaft 4' and to the right into engagement with the governor pad 20 as shown in Fig. 2. The pressure of the governor disc 12 against the pad 20 turns or tends to turn the bell crank lever 23 on its pivot 26, pressing the other arm 37 against the flat surface 38 of the lip 39 on the end of the long arm 40 of the bell crank lever 41, thus causing the brake pad 47 to press against the brake disc 19.

If now the power of the electric motor slightly increases, the disc 12 will press harder against the pad 20, applying more pressure on the bell crank lever 41 and increasing the braking pressure of the pad 47 of the brake disc 19, thus immediately reducing the speed of the governor shaft back to normal. Similarly, if the power of the motor be slightly decreased making a slight diminution of the speed of the governor shaft, the pressure of the lever 23 on the lever 41 will decrease and the pressure of the pad 47 on the disc 19 will be lessened, whereupon the speed of the governor shaft will increase up to the desired normal speed.

In speaking of these variations in speed it will be understood that they are exceedingly slight and that the response on the governor mechanism thereto is substantially instantaneous with the result that the speed of the governor shaft and of the motor controlled thereby will be maintained substantially constant.

But the speed at which the motor shall run may be readily adjusted, controlled and regulated without disturbing the working relationship between two bell crank levers 23 and 41. Thus, if the motor is running too slowly when the governor mechanism is set as shown in Figs. 1 and 2, it is only necessary to raise the governor adjusting screw 35 by turning it in the proper direction. As the end of the screw 35 rises the spring 36 will turn the rock shaft 28 holding the outer end of the lever 34 against the underside of the adjusting screw 35. As the rock shaft 28 is thus turned, the lever 25 fixed thereto will swing to the right of the position shown in Fig. 1 carrying bodily with it the bell crank lever 23, but the rounded end 37 of the bell crank lever 23 will merely slide over the flat surface 38 of the lip 39 but without rocking the bell crank lever 23 on its pivot.

But as the pad 20 is thus moved to the right, the speed of the motor will increase, for the disc 12 will follow the pad 20 moving to the right until such movement is stopped by its engagement with the pad 20. As a matter of fact, the speed of the motor will substantially increase as fast as the pad 20 moves and the disc 12 will be kept in engagement with the pad 20 during and simultaneously with such movement of the lever 22.

To reduce the speed of a motor which is running too fast, the screw 35 will be turned in the opposite direction, lowering the adjusting screw 35 turning the rock shaft 28 against the tension of the spring 36 and swinging the lever 25 in a clockwise direction around the axis of the rock shaft 28. In this manner the bell crank lever 23 will be bodily carried to left, the rounded end 37 freely sliding over the flat surface 38 on the end of the lever arm 40 of the bell crank lever 41.

It is to be noted that a light pressure of the governor disc 12 on the coacting pad 20 will produce a correspondingly light pressure between the rounded end 37 of the bell crank lever 23 and the lip 39, but because of the difference in the lengths of the two arms of the bell crank lever 41 a slight pressure on the lip 39 will produce a considerably greater pressure between the pad 47 and the braking disc 19 due to the leverage afforded by the long and short arms of the bell crank lever 41.

Thus this invention is particularly applicable to talking machine motors which are driven by electric motors supplied with current from public service power plants, the voltage of which is near the higher limit for which the electric motor is designed to operate. Such motors without my invention and under such conditions keep the governor disc 12 constantly hard pressed against the governor pad 20 with the result that the disc and pad wear rapidly producing a groove or channel in the governor disc. With my invention, however, the main and greater part of the braking is done by the braking disc and the pad cooperating therewith. A light pressure of the governor disc 12 against the governor pad 20 produces a relatively great braking pressure between the pad 47 and the disc 19. In this construction the braking device may be made of such materials and of such proportions and size as to reduce the wear or to so dispose it that it does not practically affect the operation of the governor or make it necessary to do anything other than to readjust the position of the controlling lever 34 to compensate for the wear on the braking disc 19 and pad 47.

In governor mechanisms the governor pad 20 is usually moved to different positions radially of the disc 12 in adjusting the speed at which the governor shall operate, and it therefore will be obvious that when the friction between the governor disc and the pad is so great as to produce a groove or channel in the face of the governor disc 12, the nice adjustment of the governor is destroyed. But if the pressure between the supplemental braking pad 47 and the braking disc 19 should be so much as to produce a channel or groove in the face of the disc 19 that would not particularly affect the operation of the governor because the position of the pad 47 with respect to the disc 19 is substantially fixed and invariable, and, therefore, the braking effect of the pad 47 against the disc 19 would be substantially the same whether the pad 47 were working on a plane surface or in a channel worn in the face or at the edge of the disc 19.

In the construction above described, the speed controlling and braking friction is applied to the fastest moving part of the motor mechanism, where slight changes in the pressures between the pads and the disc produces the greatest and quickest braking action. In the embodiment of my invention shown in the accompanying drawings, this speed controlling and governing device is on the drive shaft of the electric motor and the governor shaft of the motor, that is to say, the drive shaft of the electric motor and the governor shaft are one and the same shaft. This is because in a talking machine motor driven by an electric motor, the speed of the electric motor is high and the required speed of the turntable spindle is obtained through reduction gearing. In spring motors, however, the power shaft revolves very slowly and the governor shaft is the high speed shaft of the train of motor mechanism. In such construction the governor shaft would be separate and distinct from but driven by the power shaft of the spring barrel as is usual in spring motor constructions.

From the foregoing it will be also plain that any desired distribution of the load on the floating disc 12 and the braking disc 19 may be effected by suitably proportioning the lengths of the compound lever arms 22, 37, 40 and 45, and that the greatest governing load may be transferred or transmitted by said levers to the disc 19 fixed to the governor spindle. Thus the load on the floating governor disc 12 and the torque load on the springs 16 may be substantially reduced.

Having thus described my invention, what I claim and desire to protect by Letters Patent of the United States is:

1. In a motor mechanism the combination with a governor shaft and a governor mechanism mounted thereon, of a braking mechanism, also mounted on the governor shaft, the braking action of said braking mechanism being varied and controlled by said governor mechanism.

2. In a governor mechanism the combination of a governor shaft, a governor disc mounted thereon, a friction applying member cooperating therewith, a brake on said governor shaft, and means to vary the braking action of said brake by and in accordance with the pressure of said governor disc and said member cooperating therewith.

3. In a motor mechanism, including a speed responsive governor, comprising a governor shaft, a governor disc yieldingly mounted on said governor shaft and a friction applying element cooperating therewith, the combination of a braking mechanism also mounted on said governor shaft, the braking action of which is varied by and in accordance with the pressure with which said governor disc bears against said friction element.

4. In a motor mechanism the combination of a governor shaft, a governor disc mounted thereon and movable longitudinally thereof to different positions depending upon the speed of said shaft, a friction pad cooperating therewith, and means cooperating with said governor disc and pad to apply a braking friction to said governor shaft, and to vary said friction by and in accordance with the pressure between said governor disc and the pad cooperating therewith.

5. In a motor mechanism the combination of a governor shaft, a governor disc mounted thereon, a friction member cooperating therewith, and means controlled by said governor disc and member for applying braking friction to said governor shaft by and in accordance with the pressure between said governor disc and its cooperating member.

6. In a motor mechanism the combination of a governor shaft, a disc longitudinally slidable on said shaft to different positions depending upon the speed of said shaft, a brakable member also mounted on said shaft, friction applying means extending into the path of the longitudinal movement of said governor disc and also bearing against said brakable member whereby the pressure with which said means bears against said brakable member is varied by and in accordance with the pressure with which said disc bears against said means when the mechanism is running at normal speeds.

7. In a motor mechanism the combination of a governor shaft, a governor disc mounted thereon and movable longitudinally thereof to different positions depending upon the speed of said shaft, a friction member cooperating with said disc, a braking disc rigidly connected to said shaft and rotating therewith, a braking member cooperating therewith, and means to vary the pressure between said braking disc and the said braking member cooperating therewith by and in accordance with the pressure between said governor disc and the said friction member cooperating therewith.

8. In a governor mechanism the combination of a governor shaft, a governor disc, a friction applying member cooperating therewith, springs connecting said disc to said shaft, flyballs on said springs, a braking disc also mounted on said shaft and rigidly connected thereto to rotate therewith, friction applying means cooperating with said braking disc, and means to vary the pressure between said friction applying means and said braking disc by and in accordance with the pressure between said governor disc and the friction applying member cooperating therewith.

9. In a governor mechanism, the combination with a governor shaft, a governor disc mounted thereon and movable longitudinally thereof to different positions depending upon the speed of said shaft, springs connecting said disc to said shaft, a friction pad cooperating with said disc, a braking disc rigidly connected to said shaft and rotating therewith, a friction pad cooperating with said braking disc, and means to vary the pressure between said braking disc and the pad cooperating therewith by and in accordance with the pressure between said governor disc and the pad cooperating therewith.

10. In a motor mechanism the combination of a governor shaft, a governor disc movable longitudinally of said shaft, a yielding connection between said shaft and said governor disc, a friction pad cooperating with said governor disc, a braking disc rigidly secured to said shaft and rotating therewith, a braking pad cooperating with said braking disc and a connection between said friction pad and said braking pad whereby the pressure between said braking pad and said braking disc is varied by and in accordance with the pressure with which said governor disc bears against said friction pad when said motor is running at normal speeds.

In witness whereof, I have hereunto set my hand this 14th day of August, 1924.

SAMUEL H. WISMER.